United States Patent [19]

Dijkmans et al.

[11] 4,254,442

[45] Mar. 3, 1981

[54] CIRCUIT FOR THE PROTECTION OF TELEPHONE LINES

[75] Inventors: Eise C. Dijkmans; Franciscus A. C. M. Schoofs, both of Eindhoven, Netherlands

[73] Assignee: U.S. Philips Corporation, New York, N.Y.

[21] Appl. No.: 859,543

[22] Filed: Dec. 12, 1977

[30] Foreign Application Priority Data

Dec. 20, 1976 [NL] Netherlands ................... 7614118

[51] Int. Cl.³ ............................................. H02H 3/20
[52] U.S. Cl. ........................................ 361/56; 361/91; 361/111; 361/119
[58] Field of Search ............... 361/56, 91, 88, 110, 361/111, 118, 119; 328/169, 171; 307/237

[56] References Cited

U.S. PATENT DOCUMENTS

| | | | |
|---|---|---|---|
| 3,181,033 | 4/1965 | Bakker | 361/91 X |
| 3,372,285 | 3/1968 | Blazek et al. | 361/56 X |
| 3,558,830 | 1/1971 | Bender | 361/56 X |
| 3,633,093 | 1/1972 | Templeton, Jr. et al. | 361/56 X |
| 3,793,535 | 2/1974 | Chowdhuri | 361/56 X |
| 4,023,071 | 5/1977 | Fussell | 361/56 |
| 4,066,918 | 1/1978 | Heuner et al. | 361/56 X |

Primary Examiner—Patrick R. Salce
Attorney, Agent, or Firm—William J. Streeter; Bernard Franzblau

[57] ABSTRACT

Arrangement for protecting telephone lines and electronic circuits connected thereto from overvoltages. A first pair of diodes clamp the voltage of each wire versus the supply voltages in cooperation with a current limiting impedance. A second pair of (Zener-) diodes, separated from the first diode pair by means of a current limiting impedance, clamp the forward "transient" produced across the first diode pair versus the same or slightly different supply voltages.

7 Claims, 3 Drawing Figures

CIRCUIT FOR THE PROTECTION OF TELEPHONE LINES

BACKGROUND OF THE INVENTION (1) Field of the Invention

The invention relates to the protection of telephone lines from overvoltages caused by lightning and induction, for example from nearby heavy-current AC supplies.

In particular it relates to the protection of the electronic circuits which are connected in the telephone exchange to the telephone line.

(2) Description of the Prior Art

Known means for the coarse protection of telephone line include fuses, lightning protectors in the form of a narrow gap between two conducting electrodes (carbon blocks), gas discharge protectors and so-called heat coils.

In order to provide fine protection of the telephone lines, semiconductor diodes and zener diodes are used which clamp the voltages of the wires of the telephone line to a given level during the occurrence of overvoltages due to lightning or induction from a high-current AC supply. Impedances are usually connected into the telephone line to limit the current, or a portion of the telephone line itself is used as an impedance.

If the wires of the telephone line are clamped to the supply voltages of the electronic circuit by means of limiter diodes and with current limiting resistors in the wires the following phenomena are produced.

During an induction surge the initial voltage across the limiter diode is considerably greater than the steady state value owing to the inertia of the modulation of the diode resistance and owing to the self-induction of the supply leads.

The current which flows through the limiter diode to a supply voltage terminal increases the supply voltage owing to the internal impedance of the power supply source.

SUMMARY OF THE INVENTION

It is an object of the invention to provide an arrangement which is suitable for protecting electronic circuits, IC's (integrated circuits) in particular, which are directly connected to the telephone lines.

The arrangement in accordance with the invention for protecting telephone lines from overvoltages comprises a first pair of semiconductor diodes which are connected with the same polarity in series between two points of constant potential in such a way that the diodes are normally blocked and wherein the junction between the diodes is connected to a wire of the telephone line so that in the case of the occurrence of overvoltages the voltage of the wire is clamped to the potential of one or the other point of constant potential and is characterized in that a second pair of semiconductor diodes is present which also are connected with the same polarity in series between two points of constant potential in such a way that the diodes are normally blocked and wherein the junction between the diodes is connected to the wire of the telephone line and that an impedance is connected into the wire of the telephone line between the junction with the first pair of diodes and the junction with the second pair of diodes and wherein the potential range between the points of constant potential of the second diode pair is greater than or equal to that of the first pair.

The voltage surge which is produced across a diode of the first pair is considerably weakened by the intermediate impedance and a diode of the second pair, which already results in an improved protection of the IC.

To obtain a still better protection from overvoltages the diodes of the second pair are constructed as zener diodes. If in this case the voltage transient remaining across a diode of the second pair exceeds the zener voltage of the other diode the overvoltage is also conducted to the other supply voltage line. The result hereof is a simultaneous increase in both supply voltages which is less harmful than increasing the difference between the supply voltages.

It is of importance that the surge impedance of the supply be kept as low as possible which can be obtained by using short leads and thick conductors.

DESCRIPTION OF THE EMBODIMENTS

Figure 1:
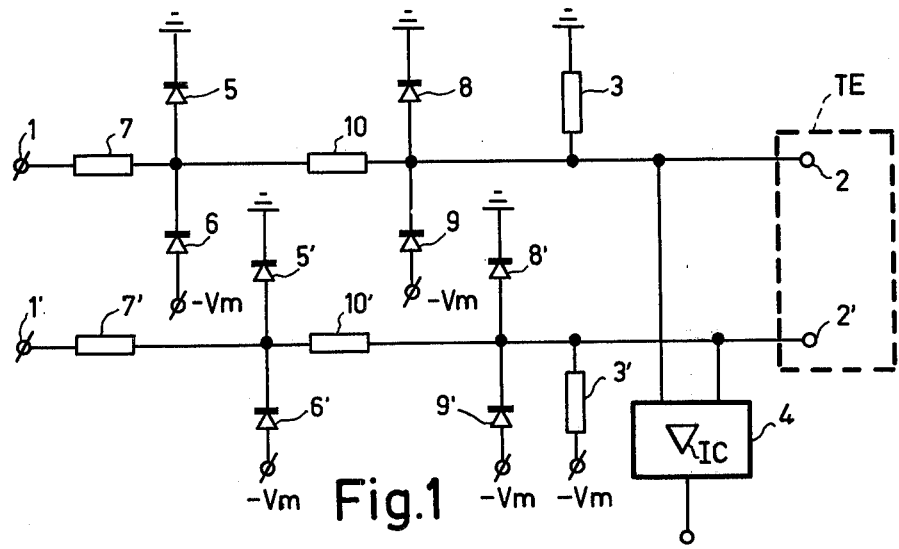
FIG. 1 is a diagram of an arrangement according to the invention.
Figure 2:
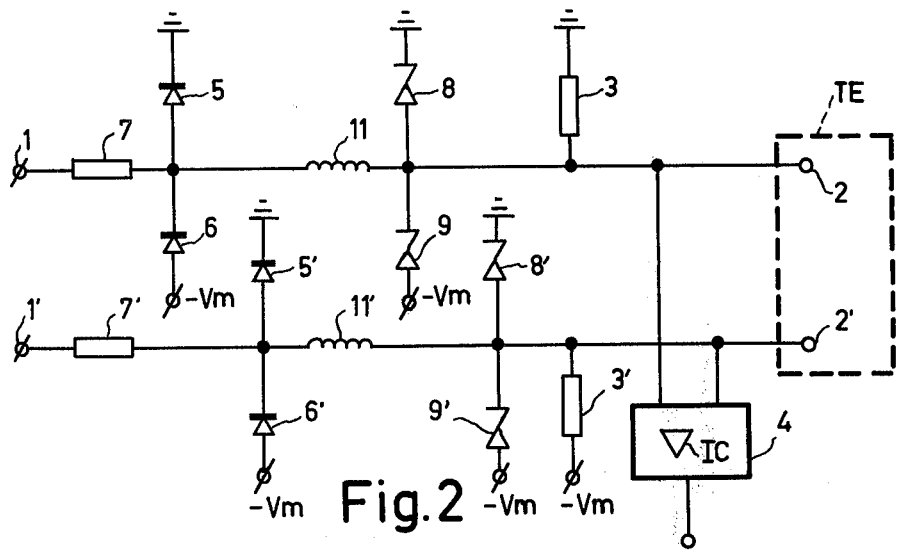
FIG. 2 is a diagram of a variant of the arrangement according to FIG. 1.

In FIGS. 1 and 2, 1-1' indicate the input terminals and 2-2' the output terminals of a connection circuit for a telephone line.

The terminals 1-1' are at the subscriber's side, where a subscriber's line can be connected. The terminals 2-2' are at the side of the exchange. The telephone exchange is indicated by the block TE.

The quiescent-supply resistors 3 and 3' are connected to the telephone line. These resistors connect the wires of the telephone line to the central battery (−Vm and ground).

In addition there is connected to the telephone line a so-called loop detector 4 which comprises an operational amplifier in the form of an IC (integrated circuit). This loop detector 4 determines from a measurement of the voltage between the wires whether the loop across the telephone line is open or closed.

The input of the operational amplifier is connected to the telephone line, possibly through an attenuator to bring the voltages at the input within the operating range.

In FIGS. 1 and 2 references 5 and 6 and 5' and 6' indicate limiter diodes which clamp the voltages of the wires to the voltages of the central battery, one of which is indicated by ground and the other by −Vm. These limiter diodes cooperate with the resistors 7 and 7' connected in the wires.

The occurrence of overvoltages is accompanied by voltage transients across the limiter diodes which, owing to the inertia of the resistance modulation are considerably above the steady state value (forward "transient").

In order to decrease or to eliminate possible harmful effects on the IC in the loop detector 4 and other IC's in the telephone exchange TE, each wire is connected to a second pair of diodes 8 and 9 and 8' and 9'. These diodes furnish an additional limitation of the voltage of the wires against the battery voltages.

The limiter diodes of the second pair cooperate with the limiter resistor 10 or 10' connected between the first and the second diode pair. These resistors as well as the resistors 7 and 7' may have a value of approximately 10 to 20 Ohms.

Instead of limiter resistors other limiting impedances also can be used. In FIG. 2 a self-inductor 11 and 11' is connected between the first and the second pair of limiter diodes of each wire. A practical value of these inductors is approximately 0.5 μH. In practice a portion of the telephone line itself can function as an impedance instead of a concentrated impedance.

During a positive voltage transient on the top wire of the telephone line the voltage across diode 8 will still be able to exceed ground potential owing to the so-called forward "transient". For this reason the diodes 8 and 9 and 8' and 9', as indicated in FIG. 2, are preferably constructed as zener diodes.

During the forward transient across diode 8 zener diode 9 furnishes a second limitation of the wire voltage, this time against the battery voltage $-Vm$.

In this manner a simultaneous limitation of the voltage of a wire versus the two supply voltages is obtained. An advantage thereof is that the impedances of the supply leads of the supply voltages are placed in parallel and therefore have together half the impedance. In this manner it is promoted that the supply voltages are increased to a lesser degree by the voltage transient. In addition both supply voltages are increased so that the difference increases to a lesser degree.

A diode of the second pair of diodes will only conduct during the forward "transient" across a diode of the first pair. So during a positive voltage transient on the top wire of the telephone line a forward "transient" will be produced across diode 5. During this "transient" diode 8 of the second pair is conducting and a voltage drop will occur across impedance 10 or 11.

The energy which is dissipated in the diodes of the second pair is low compared with that of the first pair. As a consequence it is possible to utilize cheaper or faster diodes or zener diodes (as indicated here above already) for the second pair.

In order to still further reduce the dissipation of energy in the diodes it may be useful to connect the diodes of the second pair to supply potentials which are situated outside the range between the supply potentials of the first pair. So diodes 8 and 8' would have to be connected to a positive potential and the diodes 9 and 9' to a potential which is more negative than $-Vm$ to reduce the dissipation.

Figure 3:
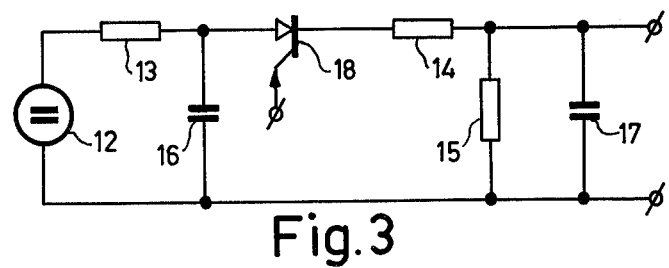
FIG. 3 is the diagram of a circuit for artificially generating overvoltages.

For the practical testing of the connection circuit a circuit in accordance with FIG. 3 may be used with the following data.

voltage source 12: 1800 Volts
resistor 13: 200 k Ohm
resistor 14: 10 Ohm
resistor 15: 100 Ohm
capacitor 16: 16 μF.
capacitor 17: 0.2 μF.
controlled rectifier 18: BTW 92

A circuit as shown in FIG. 2 having diodes: BA 145 and zener diodes: BZY93 was tested in combination with the IC's: FCH 141 and FJH 141 in the loop detector 4 with the voltage transients produced by the circuit of FIG. 3. It appeared that the IC's can withstand the pulses still remaining on the supply ($-Vm = +5$ Volts in this case) and at the input.

What is claimed is:

1. An arrangement for protecting a semiconductor circuit coupled to telephone lines from overvoltages occurring on said telephone lines comprising, a first pair of semiconductor diodes connected in series and with the same polarity between two points of constant potential such that the diodes are normally blocked, means connecting the junction between the diodes to a wire of the telephone line so that if overvoltages occur on said telephone line the voltage of the wire is clamped to the potential of the one or the other point of constant potential, a second pair of semiconductor zener diodes connected in series and with the same polarity between two points of constant potential such that the diodes are normally blocked, means connecting the junction between the second pair of diodes to said wire of the telephone line, and an impedance element connected in the wire of the telephone line between the junction with the first pair of diodes and the junction with the second pair of diodes, and wherein the potential range between the points of constant potential of the second pair of diodes is greater than or equal to that of the first diode pair.

2. An arrangement for protecting a semiconductor circuit coupled to telephone lines from overvoltages occurring on said telephone lines comprising, a first pair of semiconductor diodes connected in series and with the same polarity between two points of constant potential such that the diodes are normally blocked, means connecting the junction between the diodes to a wire of the telephone line so that if overvoltages occur on said telephone line the voltage of the wire is clamped to the potential of the one or the other point of constant potential, a second pair of semiconductor diodes connected in series and with the same polarity between two points of constant potential such that the diodes are normally blocked, means connecting the junction between the second pair of diodes to said wire of the telephone line, the series impedance of at least one pair of said diodes being independent of any intrinsic impedance of said semiconductor circuit and the reverse breakdown voltage of said one pair of diodes being independent of the reverse breakdown voltage of any other diode connected between said two points of constant potential, and an impedance element which comprises a portion of the telephone line connected in the wire of the telephone line between the junction with the first pair of diodes and the junction with the second pair of diodes, and wherein the potential range between the points of constant potential of the second pair of diodes is greater than or equal to that of the first diode pair.

3. An arrangement for protecting a semiconductor circuit coupled to telephone lines from overvoltages occurring on said telephone lines comprising, a first pair of semiconductor diodes connected in series and with the same polarity between two points of constant potential such that the diodes are normally blocked, means connecting the junction between the diodes to a wire of the telephone line so that if overvoltages occur on said telephone line the voltage of the wire is clamped to the potential of the one or the other point of constant potential, a second pair of semiconductor unidirectional zener diodes connected in series aiding configuration between two points of constant potential such that the diodes are normally blocked, means connecting the junction between the second pair of diodes to said wire of the telephone line, and an impedance element connected in the wire of the telephone line between the junction with the first pair of diodes and the junction with the second pair of diodes, and wherein the potential range between the points of constant potential of the second pair of diodes is greater than or equal to that of the first diode pair.

4. An arrangement for protecting a semiconductor circuit coupled to telephone lines from overvoltages occurring on said telephone lines comprising, a first pair of semiconductor diodes connected in series and with the same polarity between two points of constant potential such that the diodes are normally blocked, means connecting the junction between the diodes to a wire of the telephone line so that if overvoltages occur on said telephone line the voltage of the wire is clamped to the potential of the one or the other point of constant potential, a second pair of semiconductor diodes connected in series and with the same polarity between two points of constant potential such that the diodes are normally blocked, and wherein the potential range between the points of constant potential of the second pair of diodes is greater than or equal to that of the first diode pair, means connecting the junction between the second pair of diodes to said wire of the telephone line, and an impedance element connected in the wire of the telephone line between the junction with the first pair of diodes and the junction with the second pair of diodes, and wherein the two points of constant potential to which said first pair of diodes are connected comprise first and second voltage levels in which the first voltage level is more positive than the second voltage level and wherein the two points of constant potential to which said second pair of diodes are connected comprise third and fourth voltage levels more positive than and more negative than said first and second voltage levels, respectively.

5. An overvoltage protection apparatus for an electronic circuit having two inputs for connection to the two wires of a telephone line comprising, two input terminals and two output terminals, means for connecting said two output terminals to respective ones of said two inputs of the electronic circuit, means for connecting said two input terminals to respective ones of said two wires of said telephone line, first and second diode circuit means, each of said first and second diode circuit means comprising a first pair of diodes connected in series between two points of distinct constant potential such that said diodes are normally blocked and a second pair of series connected diodes similar to said first pair of diodes, said first and second pairs of diodes being connected in parallel, means connecting the junction between the diodes of the respective first pairs of diodes to a first one of said output terminals and a first one of said input terminals, respectively, means connecting the junction between the diodes of the respective second pairs of diodes to a second one of said output terminals and a second one of said input terminals, respectively, first and second impedance means connecting the respective junctions between the diodes of the first and second pairs in said first diode circuit means to the respective junctions between the diodes of the first and second pairs in said second diode circuit means, respectively.

6. An apparatus as claimed in claim 5 wherein the first and second impedance means each comprise an inductor.

7. The apparatus as claimed in claim 5 wherein each of the diodes in said first diode circuit means comprises a Zener diode.

* * * * *